United States Patent [19]

Rigney, II

[11] Patent Number: 5,270,601
[45] Date of Patent: Dec. 14, 1993

[54] SUPERCONDUCTING COMPOSITE MAGNETIC BEARINGS

[75] Inventor: Thomas K. Rigney, II, Torrance, Calif.

[73] Assignee: Allied-Signal, Inc., Morris Township, Morris County, N.J.

[21] Appl. No.: 778,540

[22] Filed: Oct. 17, 1991

[51] Int. Cl.$^5$ .......................... H02K 7/09; H01F 7/00; H01F 7/22

[52] U.S. Cl. .................... 310/90.5; 335/229; 505/879

[58] Field of Search ............... 310/90.5; 505/876, 879, 505/903; 335/216, 229, 302, 303, 306

[56] References Cited

U.S. PATENT DOCUMENTS

| | | | |
|---|---|---|---|
| 3,614,181 | 10/1971 | Meeks | 310/90.5 |
| 3,779,618 | 12/1973 | Soglia et al. | 310/90.5 |
| 3,784,945 | 1/1974 | Baermann | 335/302 |
| 3,791,704 | 2/1974 | Perper | 310/90.5 |
| 3,890,019 | 6/1975 | Boden et al. | 310/90.5 |
| 4,072,370 | 2/1978 | Wasson | 310/90.5 |
| 4,340,261 | 7/1982 | Wehde | 310/90.5 |
| 4,620,752 | 11/1986 | Fremerey | 310/90.5 |
| 4,717,627 | 1/1988 | Nellis et al. | 428/552 |
| 4,797,386 | 1/1989 | Gyorgy et al. | 505/1 |
| 4,892,863 | 1/1990 | Agarwala et al. | 505/1 |
| 4,917,736 | 4/1990 | Leupold | 148/108 |
| 4,939,120 | 12/1989 | Moon | 505/1 |
| 4,942,151 | 7/1990 | Capone et al. | 505/1 |
| 4,954,481 | 9/1990 | Dereggi | 505/1 |
| 5,126,611 | 6/1992 | Armstrong et al. | 310/90.5 |
| 5,130,588 | 7/1992 | Armstrong et al. | 310/90.5 |

Primary Examiner—Steven L. Stephan
Assistant Examiner—D. R. Haszko
Attorney, Agent, or Firm—Hugh P. Gortler; Robert A. Walsh

[57] ABSTRACT

A composite includes granules of Type II superconducting material and granules of rare-earth permanent magnets that are distributed in a binder. The composite is a two-phase structure that combines the properties of the superconductor and magnets with the flexibility and toughness of a polymeric material. A bearing made from this composite has the load capacity and stiffness of a permanent magnet bearing with added stability from a Type II superconducting material.

19 Claims, 2 Drawing Sheets

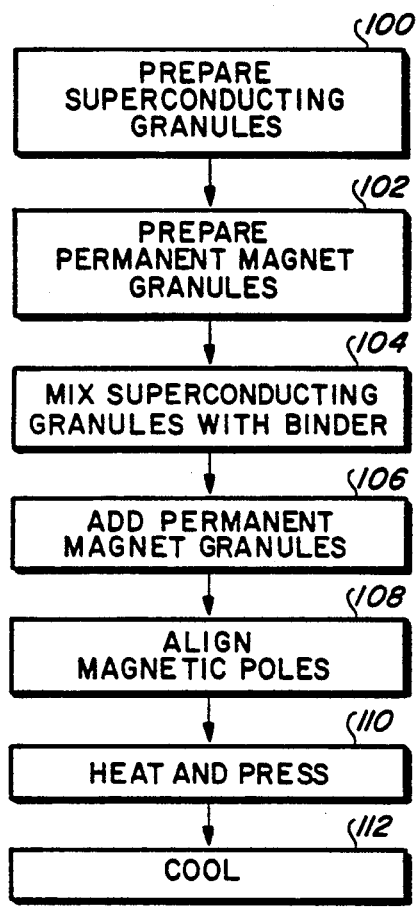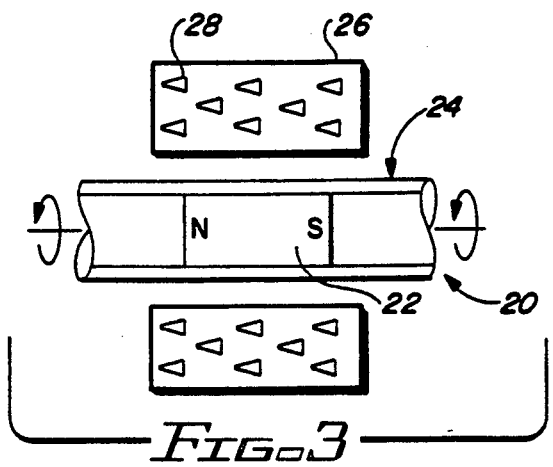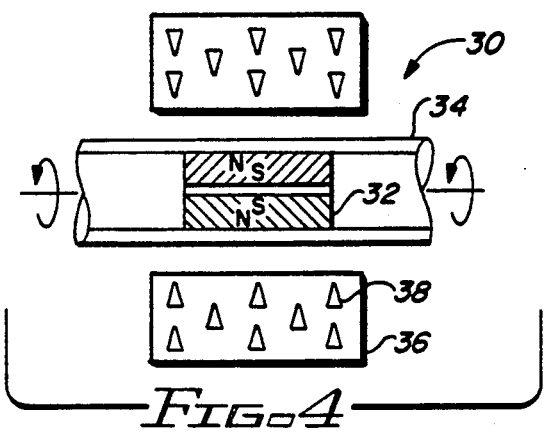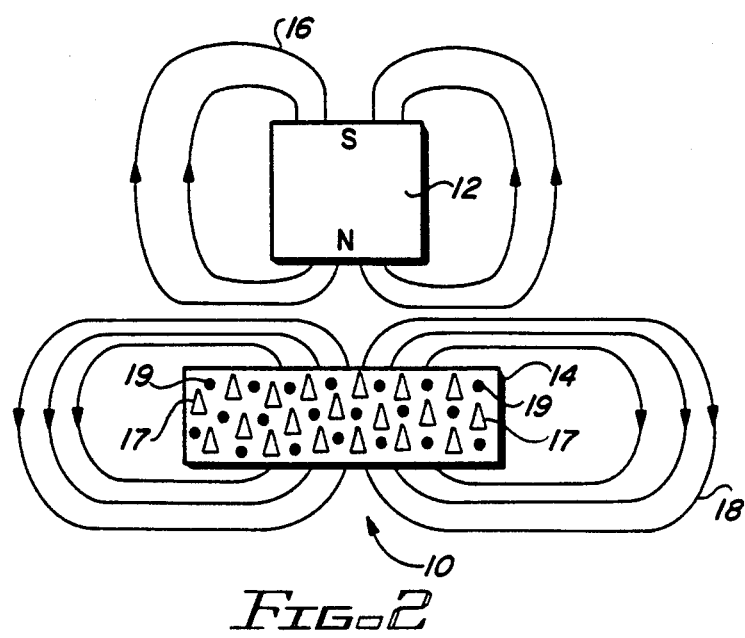

SUPERCONDUCTING COMPOSITE MAGNETIC BEARINGS

This invention was made with Government support under contract No. N00014-88-C-0668, awarded by DARPA/ONR. The Government has certain rights to this invention.

FIELD OF THE INVENTION

The present invention relates in general to superconducting composites and in particular to superconducting composites for passive magnetic bearings.

BACKGROUND OF THE INVENTION

Bearing capacity and stiffness. Load capacity denotes rotor capacity and stiffness. Load capacity denotes rotor support limit during operation. Stiffness denotes the restoring force imparted to a shaft by the bearing when the shaft is deflected from its geometric axis. High bearing stiffness is desirable in order to maintain accurate shaft positioning as loads are applied to the shaft.

Conventional passive magnetic bearings are noted for their high load capacity and stiffness. Such bearings are characterized by two sets of permanent magnets. One set of magnets is employed in the rotor, and the other of magnets is employed in the stator. Repulsive forces between the two sets of magnets cause the shaft to be suspended. The shaft can be rotated by a minimal amount of force. See, e.g., Meeks U.S. Pat. No. 3,614,181 and Wasson U.S. Pat. No. 4,072,370.

According to Earnshaws Theorem, however, total permanent magnet levitation is inherently unstable since the force is related to the inverse square of the distance. As a consequence of this instability, conventional passive magnetic bearings are not practical for use in bearing systems.

High-temperature superconducting bearings are noted for long life, reliability and low parasitic bearing power loss. These passive bearings can be made of Type I and Type II superconducting materials. Type I superconductors have the ability to screen out all or some of the magnetic flux applied by an external source. When cooled below a critical temperature $T_C$, Type I superconductors exhibit total flux expulsion for applied magnetic fields less than some critical field $H_C$. This phenomenon is known as the "Meissner Effect." When expelled, the flux flows around the superconductor, providing a lifting force. This lifting force causes a magnet to be levitated above a Type I superconductor that is held stationary.

However, bearings made of Type I superconducting materials are thought to experience rotor stability problems. As with conventional passive magnetic bearings, bearings made of Type I superconducting materials are not practical for use in bearing systems.

Type II superconducting materials are more commonly used for rotating bearings. Type II superconductors also exhibit total flux expulsion for applied magnetic fields less than a first critical field $H_{C1}$. For applied magnetic fields in excess of a second critical field $H_{C2}$, the superconductivity is lost. In between critical fields $H_{C1}$ and $H_{C2}$, however, Type II superconductors exhibit partial flux exclusion. Partial flux exclusion is believed to be caused by inhomogeneities (e.g., pores, inclusions, grain boundaries) inside the Type II superconductor. When the magnetic field is being induced into the superconductor, the superconductor offers resistance to change or displacement of this induced magnetic field. Some of the magnetic flux lines become "pinned" within the superconducting material. This phenomenon is known as "flux-pinning." The remaining flux lines are repelled by the flux lines pinned in the superconductor. This repulsion causes levitation. Thus, levitation does not arise from the Meissner effect. Instead, levitation occurs because the superconductor behaves more like a perfect conductor than a Meissner conductor.

Due to its flux-pinning properties, the Type II superconducting material gives superconducting bearings a measure of stability. Thrust bearings can be created by levitating a magnet above a disk made of a Type II superconductor. See, e.g., Agarwala U.S. Pat. No. 4,892,863. Journal bearings can be created by levitating a cylindrical magnet inside a hollow cylinder made of Type II superconducting material. See, e.g., Gyorgy et al. U.S. Pat. No. 4,797,386.

High-temperature superconducting bearings are ideal for use in aerospace turbomachinery applications where long life, reliability, and low parasitic bearing power loss are required. However, bearings made of Type II superconducting material have only the levitation force (load capacity) and rotor equilibrium restoration force (stiffness) for applications requiring very low load capacity and stiffness.

Therefore, it is an object of the present invention to provide a passive bearing that has the strength and machinability of a composite material, the load capacity and stiffness of a permanent magnet and the stability of a Type II superconducting material.

SUMMARY OF THE INVENTION

Granules of Type II superconducting material and granules of permanent magnets are distributed in a binder. The resulting composite is strong, yet can be machined easily into a bearing structure. Journal bearings can be made by placing a cylindrical rare-earth permanent magnet inside a hollow cylinder made of the composite. Thrust bearings can be made by disposing a rare-earth permanent magnet opposite a disk made of the composite. For both the thrust and journal bearings, grains of the permanent magnets must be aligned in the same direction as the magnetic granules of the composite. These journal and thrust bearings have the load capacity and stiffness of a permanent magnet bearing and the stability of a Type II superconducting bearing.

BRIEF DESCRIPTION OF THE DRAWINGS

FIG. 1 is a flowchart of a process for making a superconducting composite according to the present invention;

FIG. 2 is a schematic diagram of a superconducting bearing according to the present invention;

FIGS. 3 and 4 depict various embodiments of journal bearings according to the present invention.

DETAILED DESCRIPTION OF THE PREFERRED EMBODIMENT

Figure 5:
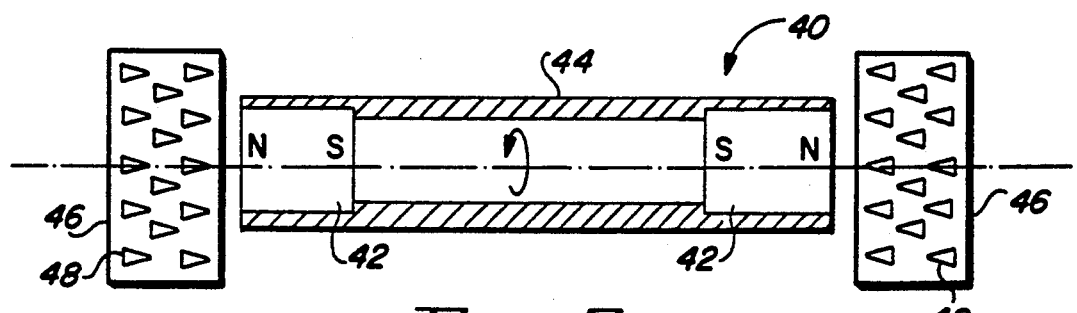
FIGS. 5-7 depict various embodiments of thrust bearings according to the present invention.

Referring to FIG. 1, a composite is formed from granules of a Type II superconducting material, granules of permanent magnets and a binder. The superconducting granules are prepared from an "extreme" Type II superconductor (step 100). Extreme Type II superconductors are noted for a high critical temperature $T_C$, strong anisotropy of the magnetic and electric properties, a large upper critical field $H_{C2}$, and substantial flux pinning. A preferred superconductor is a 1-2-3 phase Yttrium-Barium-Copper oxide such as $YBa_2Cu_3O_x$. Although not preferred, Bi-Sr-Ca-Cu or Tl-Ba-Ca-Cu oxides can be used instead. The "green" Type II superconducting powder is melt-textured to achieve superconducting properties. Melt-texturing is well known to those skilled in the art. Alternately, the Type II superconducting powder can be sintered. The resulting ceramic is ground down to granules having grain sizes of about 3 mm and less. In general, the larger melt-textured granules are better than the smaller melt-textured granules. The superconducting granules are then sieved through gradated screens to select granules of desired sizes. Then, the selected granules are annealed.

To obtain the permanent magnet granules (step 102), high-strength, rare-earth permanent magnets are ground to grain sizes of 4 mm and less. The rare earth magnets are preferably neodymium-iron-boron or samarium-cobalt types. Prior to grinding, however, grains of the permanent magnets are magnetized in the same direction to ensure polar alignment during the bearing fabrication process. This magnetization process is well known to those skilled in the art. The ratios of superconducting granules to permanent magnet granules are varied according to the field strength of the permanent magnet and the strength offered by the superconducting granules.

The binder can be a cryogenic epoxy such as "EC-COBOND 285" from Emerson and Cumming, Inc., or it can be a thermoplastic resin such as "STRUERS" thermoplastic resin. The cryogenic epoxy provides a far stronger bond than does the thermoplastic resin. Therefore, the cryogenic epoxy is best suited for journal bearings, and the thermoplastic resin is best suited for thrust bearings. The ratio of superconducting granules to binder must be great enough to allow the binder to bind the superconducting granules, yet not so great that the binder interferes with the superconducting properties of the superconducting granules.

The melt-textured Type II superconducting granules of controlled size are mixed with the binder and then poured into the cylinder of a hollow cylindrical press until about 1.0 cm to 1.3 cm of the mixture rests in the press (step 104). The cylindrical press has a built-in heating coil. A high-strength permanent magnet, covered by an aluminum plate, is placed in the bottom of the press to create a magnetic field in the cylinder.

The permanent magnet granules are then dropped individually, by sight, over the circular area of the cylinder (step 106). The magnetic field causes the permanent magnet granules to burrow their way into the mixture of Type II superconducting granules and binder. As the permanent magnet granules fall into the cylinder, their magnetic poles line up with the externally applied magnetic field (step 108). The step of alignment is crucial to the overall process.

The resulting composite of superconducting granules, permanent magnet granules and binder is then heated and pressed at 1 to 3 tons of force (step 110). Thermoplastic resins are heated for 6 minutes between temperatures of 140° C. and 160° C., whereas cryogenic epoxy is heated for 30 minutes between 90° C. and 95° C. The composite is then allowed to cool in air at ambient temperature for 3 to 10 minutes (step 112).

For example, $YBa_2Cu_3O_x$ was melt-textured and gradated to a particle size of 2-3 mm. The superconducting granules were added to an acrylic thermoplastic binder in a hollow cylindrical press until approximately 2 cm of the mixture rested in the press. Granules from the neodymium-boron-iron magnets, were added to the press. The permanent magnet granules had a particle size of 9 mm and less. The permanent magnet granules were aligned by the magnetic field of strength 4000 Gauss. The composite was heated to about 150° C., pressed at 3 tons of force, and cooled for about 4 minutes.

Resulting is a blank which, due to its composite nature, is easily machinable to various shapes and sizes. For instance, a single blank can be machined into a bearing. As a single unit, the blank has the advantage of simplified installation since tolerances are easier to control Tolerances are easier to control on one piece than on two pieces since tolerances are additive. Therefore, alignment is more easily obtained with one piece than with two or more pieces.

Referring now to FIG. 2, a bearing 10 can be realized by a rare earth permanent magnet 12 that is placed above a member 14 made of the composite formed in steps 100-112. Flux lines 16 flow between poles of the magnet 12 and act upon the member 14. The interaction of the flux lines 16 from the magnet 12 and flux lines 18 from the permanent magnet granules 17 of the member 14 causes magnetic repulsion. As a result of this repulsion, the magnet 12 is suspended above the member 14. Such a bearing 10 has a high load capacity and stiffness. However, the bearing 10 is also unstable.

When the member 14 is cooled to a temperature below the critical temperate $T_C$ of its superconducting granules 19, some of the flux lines 16 become pinned in the member 14. The flux pinning gives lateral stability to the bearing 10. Translation of the magnet 12 along the surface of the member 14 results in a change in the distribution of the flux pinned inside the member 14. Because the Type II superconducting granules resist the change in flux distribution, the magnet 12 encounters a resistance to such translation. Thus, the superconducting granules 19 provide the bearing 10 with lateral stability.

As the operating temperature is further decreased below the critical temperature $T_C$, the lateral stability of the magnet 12 is increased dramatically. See Weinberger, B.R. et al., Supercond. Sci. Technol., Vol 3, p. 381 (1990). For example, a member 14 having superconducting granules 19 of $YBa_2Cu_3O_x$ (critical temperature $T_C$ of 93° K.) could be cooled with liquid nitrogen to a temperature of 77° K. However, the bearing 10 would have greater lateral stability if the member 14 was cooled with liquid hydrogen to a temperature of 34° R.

If the magnetic granules 17 are evenly distributed throughout the member 14, it is possible that the magnetic repulsive forces could overcome the stabilizing forces resulting from the flux-pinning. Instability would result. To overcome this instability, the superconducting granules 19 can be distributed in the member 14 higher concentrations at the surface. This concentration is achieved by increasing the thickness of the layer of binder and superconducting granules 19 upon which the permanent magnet granules 17 are placed.

Although the magnet 12 offers resistance to translation, it offers very low resistance to rotation. Because the magnetic field pinned within the member 14 is nearly symmetrical, rotation of the magnet 12 about its longitudinal axis does not alter flux distribution within the member 14. Thus, the magnet 12 can be made to spin on its longitudinal axis with very little force.

Figure 6:
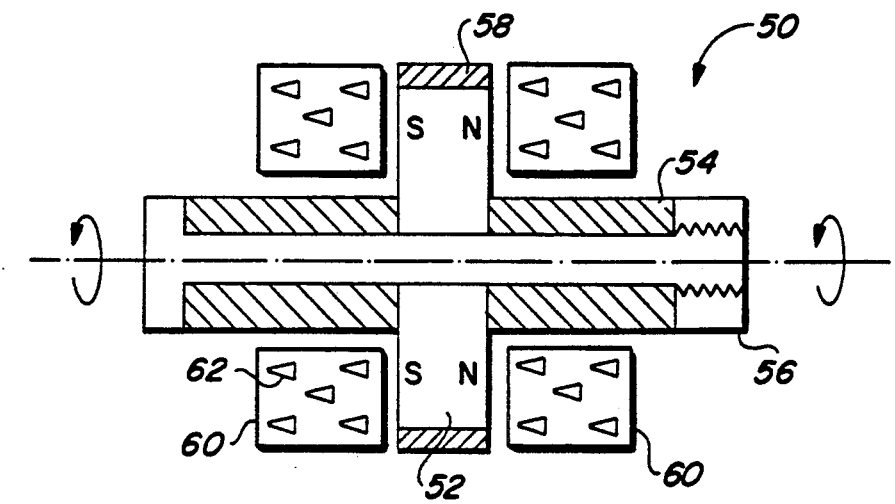
Figure 7:
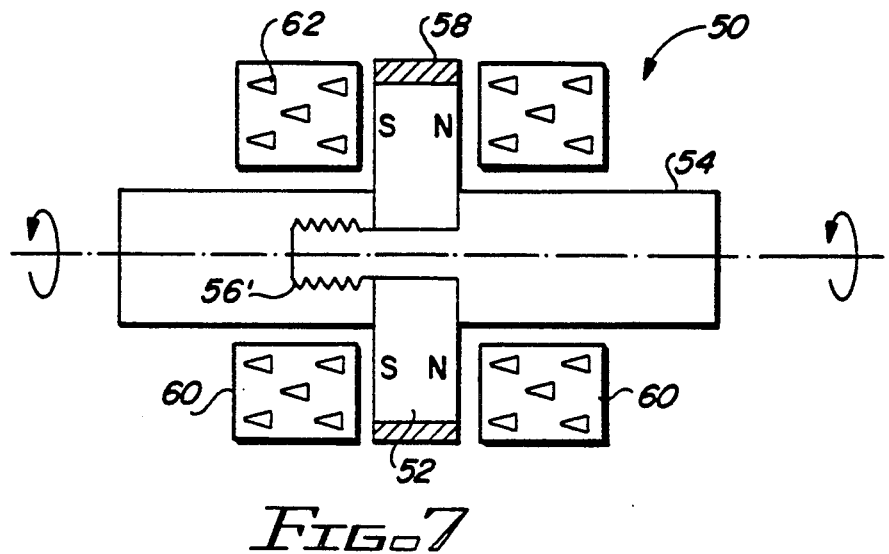

Various embodiments of superconducting bearings 5 according to the present invention are shown in FIGS. 3–7. FIGS. 3 and 4 depict journal bearings, and FIGS. 5–7 depict thrust bearings.

In FIG. 3, a journal bearing 20 includes a permanent magnet cylindrical pellet 22 that is made of a rare earth material such as samarium-cobalt or neodymium-iron-boron. Magnetized axially, the pellet 22 is inserted inside a hollow shaft 24, which is made of a non-magnetic material. A hollow cylinder 26 made of the composite described in connection with FIG. 1 has its permanent magnet granules 28 aligned in an axial direction. Thus, magnetic repulsion occurs when the shaft 24 is placed within the cylinder 26. The repulsion between the pellet 22 and the permanent magnet granules 28 gives rise to radial forces, which cause the shaft 24 to be centered within the cylinder 26. Alternately, the permanent magnet granules 28 can be aligned such that magnetic attraction causes the shaft 24 to be suspended within the cylinder 26. When the cylinder 26 is cooled with liquid Nitrogen to an operating temperature on 77° K., magnetic flux lines become pinned within the cylinder 26 and, as a result, the journal bearing 20 becomes stable.

In FIG. 4, a journal bearing 30 has a permanent magnet 32 that is encased by a hollow shaft 34. Both the grains of the permanent magnet 32 and the permanent magnet granules 36 of hollow cylinder 38 are aligned in a radial direction.

In FIG. 5, a double-acting thrust bearing 40 includes permanent magnet cylindrical pellets 42 disposed at opposite ends of a shaft 44. Magnetized axially, the pellets 42 are made of a rare-earth material. Disks 46, made of the composite described in connection with FIG. 1, oppose the pellets 42. Permanent magnet granules 48 of the disks 46 are also aligned axially such that the magnetic interaction between the pellets 42 and the magnetic granules 48 gives rise to magnetic repulsion. This repulsion causes the shaft 44 to be suspended between the disks 46. When the disks 46 are cooled with liquid Nitrogen, the pinned flux lines cause the shaft 44 to stabilize in the lateral direction.

In FIGS. 6 and 7, a double-acting thrust bearing 50 has a ring magnet 52 that is made of a rare-earth material. Magnetized axially, the ring magnet 52 surrounds a shaft 54. In FIG. 6, the ring magnet 52 is attached the shaft 54 by a tie rod 56; and in FIG. 7, the ring magnet 52 is attached the shaft 54 by a screw 56. Fitted over the ring magnet 52 is a retaining ring 58 made of a highly permeable steel such as mumetal. Disks 60 made of the composite described in connection with FIG. 1 are disposed on opposite sides of the ring magnet 52. Permanent magnet granules 62 of the disks 60 are also magnetized axially such that the resulting magnetic interaction causes the ring magnet 52 to be suspended between the two disks 60.

It will be understood that the embodiments described herein are merely exemplary and that a person skilled in the art may make many variations and modifications without departing from the spirit and scope of the invention. All such modifications are intended to be included within the scope of the invention as defined in the appended claims.

I claimed:

1. A bearing comprising:
magnetic means for providing first lines of flux; and at least one member made of a superconducting composite including Type II superconducting granules, permanent magnet granules and binding means for binding the superconducting granules and the magnetic granules, said permanent magnet granules being aligned in substantially the same direction and providing second lines of flux, said at least one member being in proximity of said magnetic means such that said second lines of flux interact with said first lines of flux.

2. A bearing according to claim 1, wherein said permanent magnet granules are rare-earth permanent magnet granules.

3. A bearing according to claim 1, wherein said Type II superconducting granules include extreme Type II superconducting granules.

4. A bearing according to claim 3, wherein said extreme Type II superconducting granules include granules of Yttrium-Barium-Copper oxide.

5. A bearing according to claim 1, wherein each of said at least one members has at least one surface, and wherein said superconducting granules have a high concentration near said surfaces.

6. A bearing according to claim 1, wherein said binding means includes thermoplastic resin.

7. A bearing according to claim 1, wherein said binding means includes cryogenic epoxy.

8. A bearing according to claim 1, wherein said magnetic means includes at least one permanent magnet, and wherein grains of said at least one permanent magnet are aligned in substantially the same direction as the poles of said permanent magnet granules.

9. A bearing according to claim 8, wherein at least one permanent magnet is a rare-earth permanent magnet.

10. A bearing according to claim 8, wherein a stator includes said at least one member and wherein a rotor includes said at least one permanent magnet.

11. A bearing according to claim 8, wherein at least one of said permanent magnets includes an annular magnet having first and second sides, and wherein said at least one member includes a first disk that is disposed opposite said first side of said annular magnet, whereby said bearing is single-acting.

12. A bearing according to claim 11, wherein said at least one member further includes a second disk that is disposed opposite said second side of said annular magnet, whereby said bearing is double-acting.

13. A bearing according to claim 12, wherein grains of said annular magnet are magnetized in an axial direction.

14. A bearing according to claim 8, wherein said magnetic means includes holding means having first and second ends, and first and second permanent magnet pellets that are magnetized axially, said first and second pellets being held at said first and second ends, respectively, of said holding means; and wherein said at least one member includes first and second disks that are disposed opposite said first and second pellets, respectively, whereby said bearing is double-acting.

15. A bearing according to claim 14, wherein said holding means includes a hollow shaft.

16. A bearing according to claim 8, wherein said at least one member includes a hollow cylinder; and wherein said at least one permanent magnet includes at least one pellet magnetized in an axial direction, said pellet being disposed for rotation within said cylinder.

17. A bearing according to claim 8, wherein said at least one member includes a hollow cylinder; and wherein said at least one permanent magnet includes at least one pellet magnetized in a radial direction, said pellet being disposed for rotation within said cylinder.

18. A journal bearing comprising:
- a stator including a hollow cylinder made of a composite including Type II superconducting granules and permanent magnet granules distributed in a binder; and
- a rotor, disposed for rotation within said hollow cylinder, including a permanent magnet pellet, wherein poles of said permanent magnet granules are aligned in the same direction as grains of said permanent magnet pellet.

19. A thrust bearing comprising:
- a rotor including an annular permanent magnet that is magnetized in an axial direction, said annular magnet having first and second sides; and
- a stator including first and second disks made of a composite including Type II superconducting granules and permanent magnets granules distributed in a binder, said first disk being disposed opposite said first side of said annular permanent magnet, said second disk being disposed opposite said second side of said annular permanent magnet, wherein poles of said permanent magnet granules are aligned in the same direction as grains of said first and second disks.

* * * * *